United States Patent
Morimoto et al.

(10) Patent No.: US 11,241,966 B2
(45) Date of Patent: Feb. 8, 2022

(54) PROTECTION CIRCUIT UNIT AND VEHICLE POWER SUPPLY DEVICE

(71) Applicant: Yazaki Corporation, Tokyo (JP)

(72) Inventors: Mitsuaki Morimoto, Shizuoka (JP);
Kazuo Sugimura, Shizuoka (JP);
Kazuya Tsubaki, Shizuoka (JP);
Eiichiro Oishi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 184 days.

(21) Appl. No.: 16/722,984

(22) Filed: Dec. 20, 2019

(65) Prior Publication Data
US 2020/0231043 A1    Jul. 23, 2020

(30) Foreign Application Priority Data

Jan. 23, 2019    (JP) .............................. JP2019-009037

(51) Int. Cl.
*B60L 3/04*     (2006.01)
*B60L 3/00*     (2019.01)

(52) U.S. Cl.
CPC ............... *B60L 3/04* (2013.01); *B60L 3/0069* (2013.01)

(58) Field of Classification Search
CPC .. B60L 3/04; B60L 3/0069; B60L 3/00; B60L 1/00; H02H 3/087; H02H 1/00; H02H 3/00; H02H 3/08; H02J 7/0063; H02J 7/0042; H02J 7/0031; B60R 16/03; H05K 1/18

USPC ................ 324/503, 508, 509, 500
See application file for complete search history.

(56) References Cited

U.S. PATENT DOCUMENTS

| | | | |
|---|---|---|---|
| 11,114,888 B2* | 9/2021 | Satake | H02M 3/145 |
| 2002/0074979 A1 | 6/2002 | Onizuka et al. | |
| 2007/0096278 A1 | 5/2007 | Nakatsu et al. | |
| 2017/0186572 A1 | 6/2017 | Kato et al. | |
| 2017/0267194 A1* | 9/2017 | Aruga | B60R 16/033 |
| 2020/0290480 A1* | 9/2020 | Tsubaki | H02J 7/1423 |
| 2021/0234320 A1* | 7/2021 | Campbell | A47K 3/10 |
| 2021/0313923 A1* | 10/2021 | Niwa | B62D 5/0496 |
| 2021/0324826 A1* | 10/2021 | Irie | F02P 3/0554 |

FOREIGN PATENT DOCUMENTS

| | | |
|---|---|---|
| DE | 10 2011 056 270 A1 | 6/2012 |
| EP | 1 203 698 A2 | 5/2002 |
| EP | 1 956 649 A2 | 8/2008 |

(Continued)

*Primary Examiner* — Giovanni Astacio-Oquendo
(74) *Attorney, Agent, or Firm* — Kenealy Vaidya LLP

(57) ABSTRACT

The protection circuit unit includes an energization module disposed on an electric path between a high-voltage battery of a vehicle and a high-voltage load receiving supply of power from the high-voltage battery, to open and close the electric path, and a control board configured to be a member separated from the energization module and electrically connected with the energization module, to control opening and closing of the electric path. The energization module includes semiconductor switches opening and closing the electric path, and a control terminal connecting the semiconductor switches with the control board. The control board includes a connection unit corresponding to the control terminal of each of a plurality of types of the energization modules.

3 Claims, 5 Drawing Sheets

(56) References Cited

FOREIGN PATENT DOCUMENTS

| | | |
|---|---|---|
| JP | 2016-12591 A | 1/2016 |
| JP | 2016-220276 A | 12/2016 |
| JP | 2018-11411 A | 1/2018 |

* cited by examiner

PROTECTION CIRCUIT UNIT AND VEHICLE POWER SUPPLY DEVICE

CROSS-REFERENCE TO RELATED APPLICATION(S)

The present application claims priority to and incorporates by reference the entire contents of Japanese Patent Application No. 2019-009037 filed in Japan on Jan. 23, 2019.

BACKGROUND OF THE INVENTION

1. Field of the Invention

The present invention relates to a protection circuit unit and a vehicle power supply device.

2. Description of the Related Art

Some vehicles, such as electric vehicles (EV) and plug-in hybrid electric vehicles (PHEV), include vehicle power supply devices disposed on an electric path supplying power from a high-voltage battery to a load, such as a motor. Vehicle power supply devices have a current shutoff function for the purpose of protecting the load and/or electric wires forming the electric path. Each of the vehicle power supply devices includes, for example, a semiconductor relay opening and closing the electric path, and a drive circuit driving the semiconductor relay, and they are mounted on a control board. For this reason, the current flowing from the high-voltage battery to the load flows through the electric path on the control board. When the current increases, it is required to increase the area of the wiring pattern and/or the thickness of the copper foil on the control board. For this reason, an electronic circuit structure has been proposed (for example, see Patent Literature 1: Japanese Patent Application Laid-open No. 2016-12591). In the electronic circuit structure, a bus bar formed by blanking a metal plate is mounted as the electric path of the control board on the control board, and the current from the high-voltage battery flows through the bus bar.

In the prior art described above, there are cases where the control board is difficult to miniaturize because a space to mount the bus bar is required on the control board. In addition, when the current flowing through the electric path on the control board is changed in accordance with change in specifications of the high-voltage battery and/or the load mounted on the vehicle, a new design is required for the bus bar and the board to mount the bus bar, and there is room for improvement in respect of a cost.

SUMMARY OF THE INVENTION

An object of the present invention is to provide a protection circuit unit and a vehicle power supply device enabling miniaturization of a control board at a low cost.

In order to achieve the above mentioned object, a protection circuit unit according to one aspect of the present invention includes at least one energization module disposed on an electric path between a power supply of a vehicle and a load receiving supply of power from the power supply, to open and close the electric path; and a control board configured to be a member separated from the energization module and electrically connected with the energization module, to control opening and closing of the electric path on the basis of an energization current flowing through the electric path, wherein the energization module includes: at least one semiconductor switch opening and closing the electric path; a bus bar connected at one end with the power supply side and connected at the other end with the load side, with the semiconductor switch interposed therebetween; and a control terminal connecting the semiconductor switch with the control board, and the control board includes a connection unit corresponding to the control terminal of each of a plurality of types of the energization modules.

In order to achieve the above mentioned object, a vehicle power supply device according to another aspect of the present invention includes the protection circuit unit; and a housing containing the energization module and the control board forming the protection circuit unit, wherein the housing includes an opening communicating with outside, the energization module includes a heat radiation surface on a side reverse to a mount surface of the control board in a state in which the energization module is mounted on the control board, and the heat radiation surface faces the opening.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following is a detailed explanation of a protection circuit unit and a vehicle power supply device according to embodiments of the present invention with reference to drawings. The present invention is not limited to the following embodiments. Constituent elements in the following embodiments include ones that the skilled person in the art could easily expect or substantially the same ones. In addition, the structures described hereinafter may be properly used in combination.

First Embodiment

Figure 1:
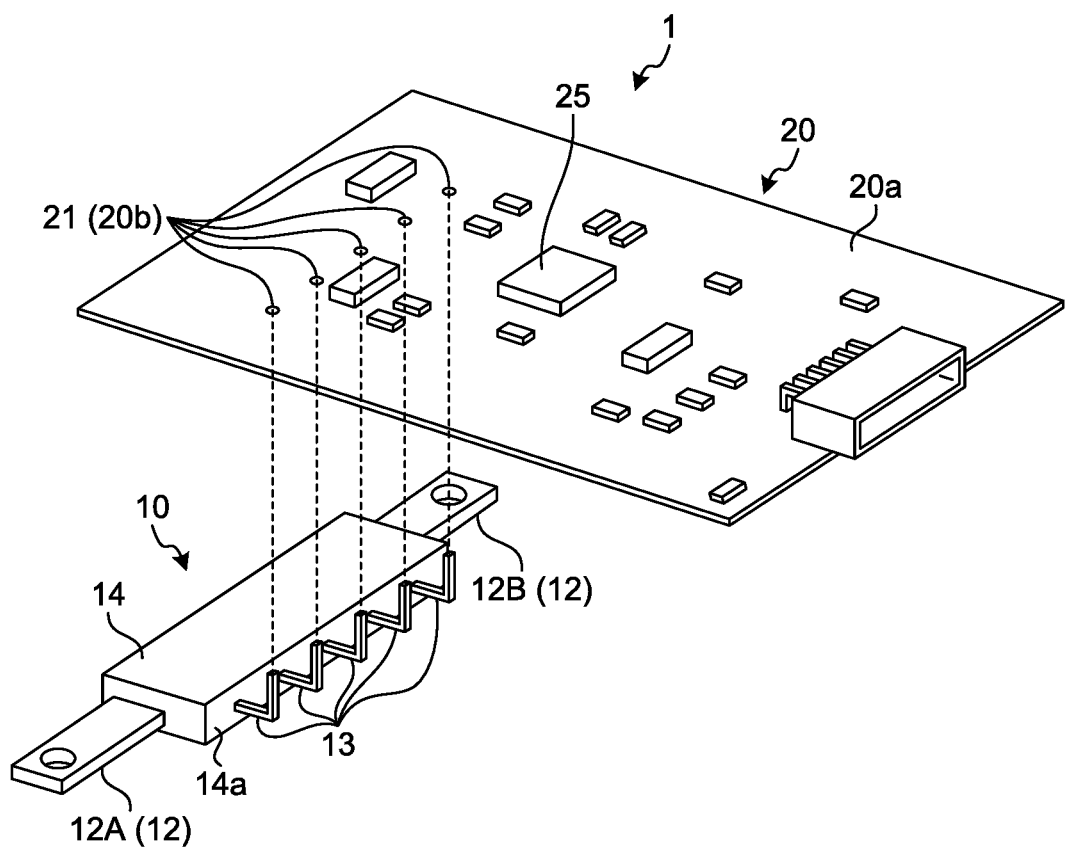
FIG. 1 is an exploded perspective view illustrating a schematic structure of a protection circuit unit according to a first embodiment.
Figure 2:
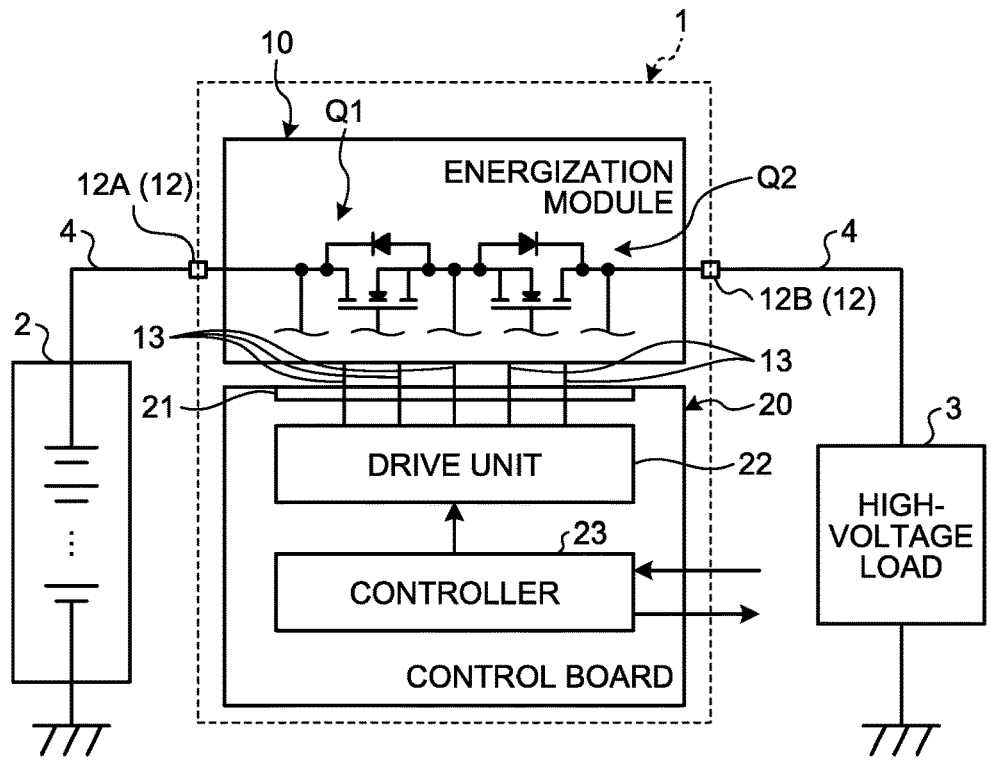
FIG. 2 is a circuit diagram illustrating a schematic structure of the protection circuit unit according to the first embodiment.
Figure 3:
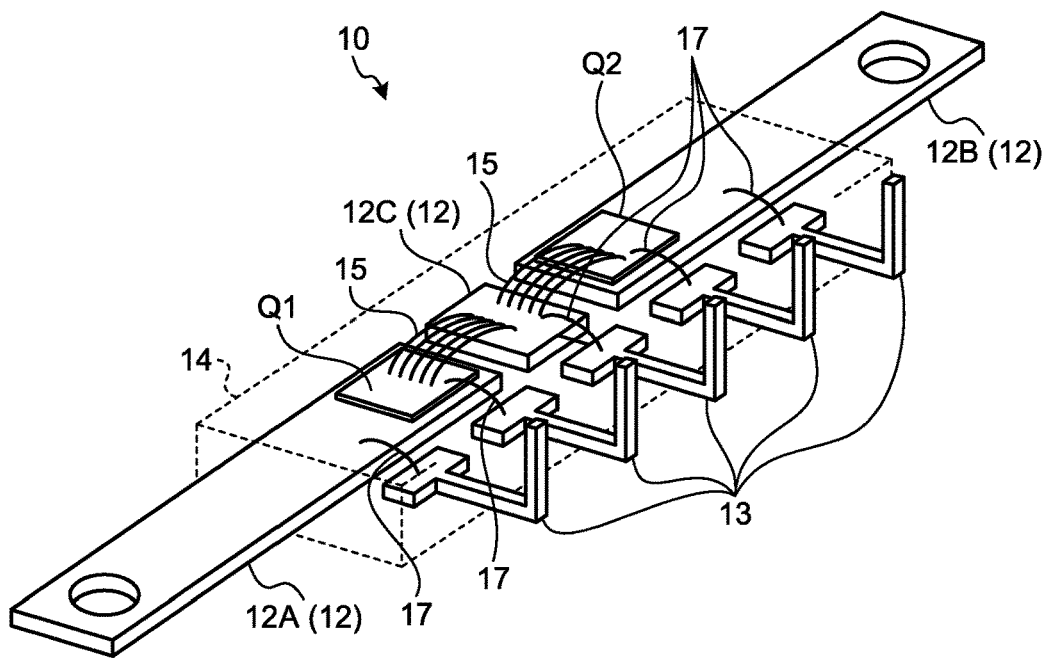
FIG. 3 is a perspective view illustrating a schematic structure of an energization module according to the first embodiment.

The following is an explanation of a protection circuit unit according to the first embodiment of the present invention with reference to FIG. 1 to FIG. 3. FIG. 1 is an exploded perspective view illustrating a schematic structure of a protection circuit unit according to the first embodiment.

FIG. 2 is a circuit diagram illustrating a schematic structure of the protection circuit unit according to the first embodiment. FIG. 3 is a perspective view illustrating a schematic structure of an energization module according to the first embodiment. FIG. 1 illustrates a state before the energization module is attached to the control board. FIG. 3 illustrates a resin mold member in the energization module with broken lines.

A protection circuit unit 1 is mounted on a vehicle, such as an electric vehicle (EV), a hybrid electric vehicle (HEV), and a plug-in hybrid electric vehicle (PHEV). As illustrated in FIG. 2, the protection circuit unit 1 is disposed on an electric path 4 between a high-voltage battery 2 of the vehicle and a high-voltage load 3 receiving supply of power from the high-voltage battery 2, and opens and closes the electric path 4 on the basis of an energization current of the electric path 4. The terms "open" and "close" of the electric path 4 mean "energization" and "shutoff" of the electric path 4. In the following explanation, electric connection is simply referred to as "connection", and electric shutoff is simply referred to as "shutoff". The protection circuit unit 1 according to the present embodiment shuts off the electric path 4, for example, when the energization current value flowing through the electric path 4 exceeds a threshold. The threshold is an upper limit value of the energization current value set to protect semiconductor switches Q1 and Q2 in the protection circuit unit 1, the high-voltage battery 2, the high-voltage load 3, and electric wires forming the electric path 4, and the like. The protection circuit unit 1 mainly includes an energization module 10 and a control board 20, as illustrated in FIG. 1 and FIG. 2.

The high-voltage battery 2 is a high-voltage power supply to drive the high-voltage load 3 mounted on the vehicle. The high-voltage battery 2 has a voltage, for example, higher than 12 V (or 24 V), and outputs direct-current power. The high-voltage battery 2 is, for example, a battery pack in which a plurality of battery cells are connected. The high-voltage battery 2 is connected at a positive electrode side with an input terminal of the protection circuit unit 1, and grounded at a negative electrode side. The high-voltage battery 2 may have different specifications, for example, according to the model of the vehicle. The high-voltage battery 2 is not limited to a battery pack, but may be of any form, as long as it is capable of supplying direct-current power.

The high-voltage load 3 is driven with direct-current power supplied from the high-voltage battery 2. For example, the high-voltage load 3 is a driving motor or the like mounted on the vehicle. The high-voltage load 3 is connected at a positive electrode side with an output terminal of the protection circuit unit 1, and grounded at a negative electrode side. The high-voltage load 3 may have different specifications, for example, according to the model of the vehicle.

The energization module 10 is disposed on the electric path 4 between the high-voltage battery 2 and the high-voltage load 3 supplied with power from the high-voltage battery 2, and opens and closes the electric path 4. As illustrated in FIG. 3, the energization module 10 includes the semiconductor switches Q1 and Q2, bus bars 12A, 12B, and 12C, a control terminal 13, and a resin mold member 14. The energization module 10 is configured to be a member separated from the control board 20 and replaceable, and a plurality of types of the energization modules 10 are prepared in accordance with the energization current values of the electric path 4. For example, the energization module 10 may have different specifications for the bus bars 12A to 12C and/or the semiconductor switches Q1 and Q2 in accordance with the energization current values of the electric path 4.

The semiconductor switches Q1 and Q2 are arranged in the electric path 4, to open and close the electric path 4. Each of the semiconductor switches Q1 and Q2 is formed of, for example, a power metal-oxide-semiconductor field-effect-transistor (MOS-FET) serving as a type of field-effect-transistors. As illustrated in FIG. 2, the semiconductor switches Q1 and Q2 are connected in series with the electric path 4 such that the forward directions of their parasitic diodes are reversed, to open and close the electric path 4. The semiconductor switch Q1 is, for example, an N-channel MOS-FET. The semiconductor switch Q2 is, for example, an N-channel MOS-FET. In the energization module 10, the flow of the power between the high-voltage battery 2 and the high-voltage load 3 is shut off, when both of the semiconductor switches Q1 and Q2 are in the off state. As illustrated in FIG. 3, each of the semiconductor switches Q1 and Q2 according to the present embodiment is formed in a state of a bare chip, and disposed on a lead frame (for example, the bus bar 12) through which the energization current flows.

As illustrated in FIG. 2, the bus bars 12A (12), 12B (12), and 12C (12) are connected at one side with the high-voltage battery 2 side, and connected at the other end with the high-voltage load 3 side, with the semiconductor switches Q1 and Q2 interposed therebetween. Each of the bus bars 12A to 12C serves as a conductive member forming part of the electric path 4, and is formed of a metal material, such as copper alloy. Each of the bus bars 12A and 12B forms an input-side terminal or an output-side terminal. For example, when the bus bar 12A forms the input-side terminal and the bus bar 12B forms the output-side terminal, the bus bar 12A is connected with the high-voltage battery 2 via the electric path 4, and the bus bar 12B is connected with the high-voltage load 3 through the electric path 4. As illustrated in FIG. 3, the bus bar 12A and the bus bar 12B are connected with each other via the semiconductor switch Q1, the bus bar 12C, and the semiconductor switch Q2, and a resin mold member 14 is formed to protect the semiconductor switches Q1 and Q2. The semiconductor switch Q1 is connected with one end portion in the extending direction of the bus bar 12A, and connected with the bus bar 12C via a plurality of bonding wires 15. The semiconductor switch Q2 is connected with the other end portion in the extending direction of the bus bar 12B, and connected with the bus bar 12C via a plurality of bonding wires 15. The bus bar 12A is connected with the control terminal 13 through a bonding wire 17. The bus bar 12B is connected with the control terminal 13 through a bonding wire 17. The bus bar 12C is connected with the control terminal 13 through a bonding wire 17. The semiconductor switches Q1 and Q2 are connected with the control terminal 13 through bonding wires 17.

The control terminal 13 is an element connected with the semiconductor switches Q1 and Q2 and supplied with signals from outside to control the semiconductor switches Q1 and Q2. The control terminal 13 according to the present embodiment functions as a connection terminal connecting the semiconductor switches Q1 and Q2 with the control board 20. The control terminal 13 includes, for example, five pin terminals common to a plurality of types of the energization modules 10. The five pin terminals are formed of, for example, a metal member having electric conductivity, and arranged at regular intervals. Each of the pins is formed to extend in a direction orthogonal to the extending direction of the bus bar 12, project from the resin mold member 14, and be bent toward the control board 20 in a state in which the energization module 10 is mounted on the control board 20.

The control terminal 13 is mounted on a surface reverse to a mount surface 20a of the control board 20 by soldering or the like, and electrically connected with the control circuit on the control board 20.

The resin mold member 14 is molded from, for example, a synthetic resin having insulating property and thermal conductivity, to cover the semiconductor switches Q1 and Q2. As illustrated in FIG. 3, the resin mold member 14 contains the whole semiconductor switches Q1 and Q2, the whole bonding wires 15, part of the control terminal 13, and part of the bus bar 12. The resin mold member 14 forms the semiconductor switches Q1 and Q2, the bus bar 12, the control terminal 13, and the bonding wires 15 as one unitary piece. The resin mold member 14 includes a heat radiation surface 14a of the energization module 10. For example, the heat radiation surface 14a is configured to be exposed to the outside as a heat radiation element of the energization module 10, but the structure is not limited thereto. For example, the heat radiation surface 14a may be a part to which a heat radiation member (heat sink) is attached, or a part attached to a housing containing the energization module 10. The energization module 10 includes the heat radiation surface 14a on a side reverse to the mount surface 20a of the control board 20, in a state in which the energization module 10 is mounted on the control board 20.

The control board 20 is configured as a member separated from the energization module 10 and electrically connected with the energization module 10, to control opening/closing of the electric path on the basis of the energization current flowing through the electric path 4. The control board 20 forms a control circuit mainly formed of a microcomputer. In the control board 20, a plurality of electronic components 25 are mounted on the mount surface 20a, and the energization module 10 is mounted on a side reverse to the mount surface 20a. The control board 20 is electrically connected with an electric control unit (ECU) (not illustrated) or the like in the vehicle, to transmit and receive signals to and from the ECU. The control board 20 according to the present embodiment includes a connection unit 21, a drive unit 22, and a controller 23.

The connection unit 21 is a connecting unit corresponding to the control terminal 13 of each of a plurality of types of the energization modules 10 and connecting the energization module 10 with the control board 20. For example, the connection unit 21 includes a plurality of through holes 20b provided on the control board 20 at intervals equal to those of the pin terminals, to correspond to the control terminal 13 including the pin terminals arranged at regular intervals. The connection unit 21 includes, for example, five through holes 20b to correspond to five pin terminals common to control terminals 13 of a plurality of types of the energization modules 10. The control terminal 13 of the energization module 10 is soldered to the through holes 20b.

The drive unit 22 is a drive circuit driving the semiconductor switches Q1 and Q2. The drive unit 22 outputs a drive signal to the semiconductor switches Q1 and Q2 connected with the connection unit 21, in response to a control signal from the controller 23. Each of the semiconductor switches Q1 and Q2 is changed to an on state in response to the drive signal, and the high-voltage battery 2 and the high-voltage load 3 are connected.

The controller 23 outputs a control signal to control driving of the energization module 10 to the drive unit 22. The control signal is, for example, a signal to perform energization and shutoff of the electric path 4 with the semiconductor switches Q1 and Q2. The controller 23 may be configured to output a control signal to the drive unit 22 on the basis of a signal input from an external ECU or the like.

The following is an explanation of an example of energization and shutoff operations of the protection circuit unit 1 according to the present embodiment. The controller 23 recognizes the open/close state of the semiconductor switches Q1 and Q2, to determine whether the electric path 4 is energized. The controller 23 acquires an energization current value detected with a current sensor (not illustrated) in a state in which the electric path 4 is energized. The controller 23 determines whether the energization current value exceeds the threshold, and outputs a control signal to the drive unit 22 when the energization current value exceeds the threshold. The drive unit 22 stops output of the drive signal to the semiconductor switches Q1 and Q2 in response to the control signal received from the controller 23. In this manner, each of the semiconductor switches Q1 and Q2 is changed to the off state, and the electric path 4 is shut off.

As explained above, the protection circuit unit 1 according to the present embodiment includes the energization module 10 disposed on the electric path 4 between the high-voltage battery 2 of the vehicle and the high-voltage load 3 receiving supply of power from the high-voltage battery 2, and opening/closing the electric path 4, and the control board 20 configured separately from the energization module 10, electrically connected with the energization module 10, and controlling opening/closing of the electric path 4 on the basis of the energization current flowing through the electric path 4. The energization module 10 includes the semiconductor switches Q1 and Q2 opening and closing the electric path 4, a bus bar 12 connected at one end with the high-voltage battery 2 side and connected at the other end with the high-voltage load 3 side with the semiconductor switches Q1 and Q2 interposed therebetween, and the control terminal 13 connected the semiconductor switches Q1 and Q2 with the control board 20. The control board 20 includes the connection unit 21 corresponding to each of control terminals 13 of a plurality of types of the energization modules 10.

The structure described above removes the necessity for flowing the high-voltage energization current flowing from the high-voltage battery 2 to the high-voltage load 3 through the control board 20, and the necessity for the space to mount the bus bar 12 on the control board. This structure enables easy miniaturization of the control board 20. In addition, because no high-voltage energization current flows through the control board 20, this structure removes the necessity for using an expensive thick copper board or a metal core board for the control board 20, and enables manufacturing of the control board 20 at a low cost. Besides, for example, even when the energization current flowing through the electric path 4 differs due to the difference in vehicle model, this structure enables compatibility with a plurality of vehicle models by changing only the energization module 10, without changing the control board 20.

Second Embodiment

Figure 4:
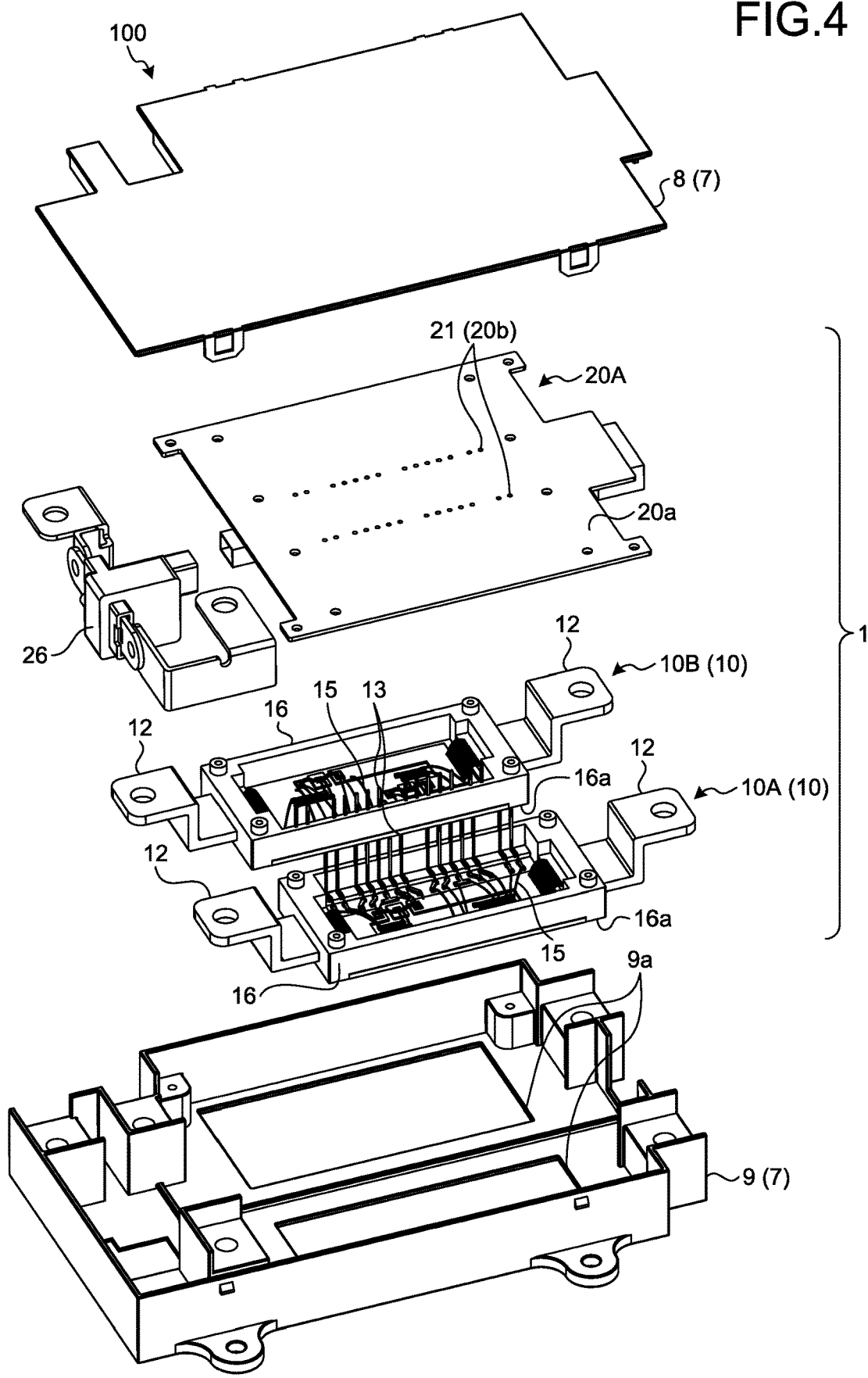
FIG. 4 is an exploded perspective view illustrating a schematic structure of a vehicle power supply device according to a second embodiment.
Figure 5:
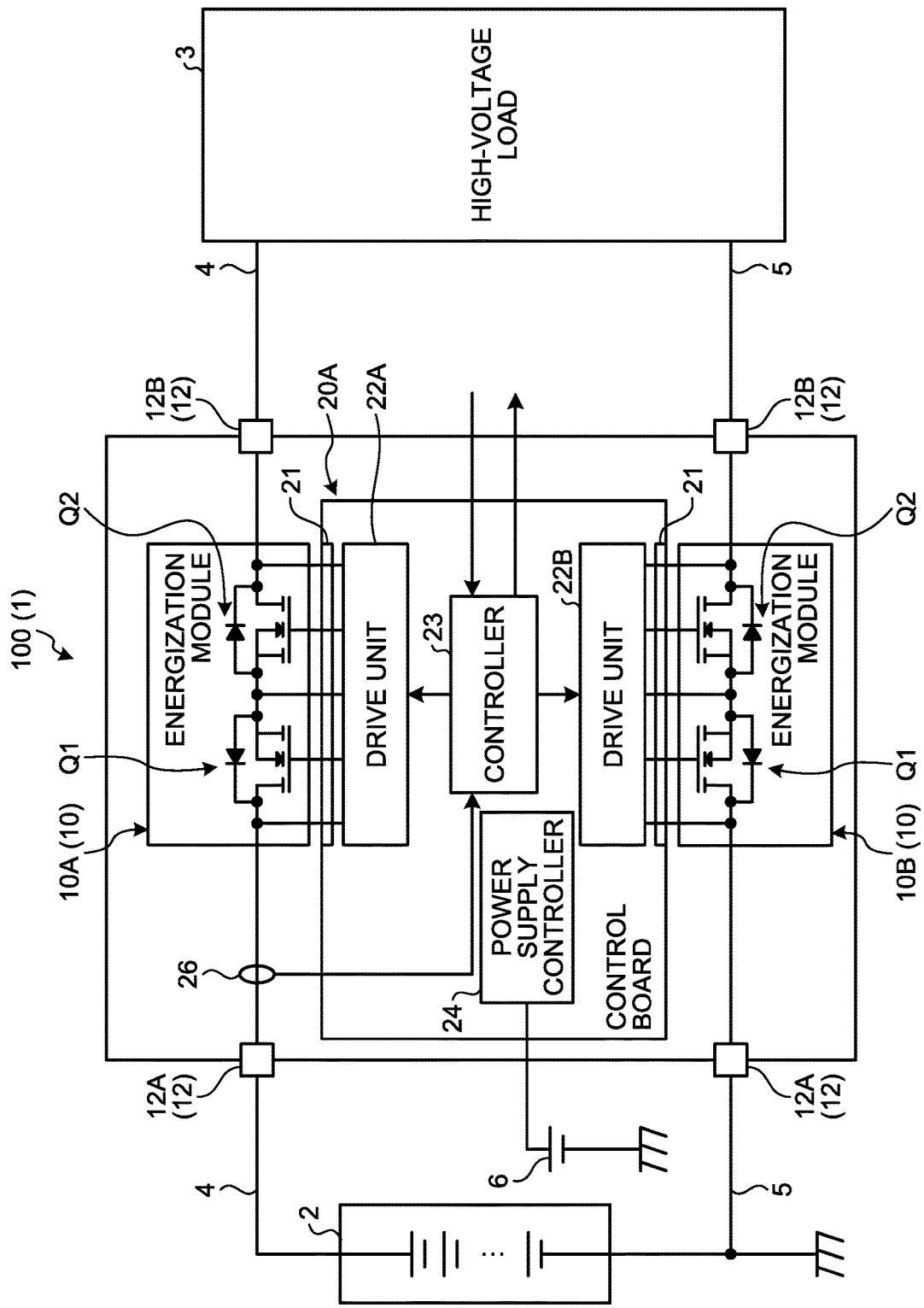
FIG. 5 is a circuit diagram illustrating a schematic structure of the vehicle power supply device according to the second embodiment.

The following is an explanation of a vehicle power supply device according to a second embodiment of the present invention, with reference to FIG. 4 and FIG. 5. FIG. 4 is an exploded perspective view illustrating a schematic structure of a vehicle power supply device according to the second embodiment. FIG. 5 is a circuit diagram illustrating a schematic structure of the vehicle power supply device according to the second embodiment.

A vehicle power supply device 100 according to the second embodiment is different from the protection circuit unit 1 according to the first embodiment described above, in that two energization modules 10A and 10B are electrically connected with a control board 20A. In the following explanation, constituent elements equal to those in the first embodiment are denoted by the same reference numerals as those in the first embodiment, and an explanation thereof is omitted.

The vehicle power supply device 100 is mounted on a vehicle, such as an electric vehicle (EV), a hybrid electric vehicle (HEV), and a plug-in hybrid electric vehicle (PHEV), like the protection circuit unit 1 described above. As illustrated in FIG. 5, the vehicle power supply device 1 is disposed on electric paths 4 and 5 between a high-voltage battery 2 of the vehicle and a high-voltage load 3 receiving supply of power from the high-voltage battery 2, to open and close each of the electric paths 4 and 5. The vehicle power supply device 100 shuts off the electric paths 4 and 5, to protect semiconductor switches Q1 and Q2 in the vehicle power supply device 100, the high-voltage battery 2, the high-voltage load 3, and electric wires forming the electric paths 4 and 5, when the energization current value flowing through the electric paths 4 and 5 exceeds the threshold. As illustrated in FIG. 4, the vehicle power supply device 100 includes a protection circuit unit 1 and a housing 7 containing the energization modules 10A and 10B and the control board 20A forming the protection circuit unit 1.

The energization module 10A is disposed on the positive-electrode-side electric path 4 between the high-voltage battery 2 and the high-voltage load 3 receiving supply of power from the high-voltage battery 2, to open and close the electric path 4. The energization module 10B is disposed on the negative-electrode-side electric path 5 between the high-voltage battery 2 and the high-voltage load 3 receiving supply of power from the high-voltage battery 2, to open and close the electric path 5. As illustrated in FIG. 5, each of the energization modules 10A and 10B includes semiconductor switches Q1 and Q2, a bus bar 12, a plurality of control terminals 13, and a housing 16. Each of the energization modules 10A and 10B are configured to be a member separated from the control board 20A and replaceable, and a plurality of types of the energization modules 10A and 10B are prepared in accordance with the energization current values of the electric paths 4 and 5. For example, the energization modules 10A and 10B may have different specifications for the bus bars 12A and 12B and/or the semiconductor switches Q1 and Q2 in accordance with the energization current values of the electric paths 4 and 5.

The housing 16 is molded from, for example, a synthetic resin having insulating property and thermal conductivity, to cover the whole semiconductor switches Q1 and Q2, the whole bonding wires 15, part of the control terminals 13, and part of the bus bar 12. The housing 16 includes heat radiation surfaces 16a of the individual energization modules 10A and 10B. The heat radiation surfaces 16a are configured to be exposed to the outside of the housing 7 as elements for heat radiation of the energization modules 10, but the structure is not limited thereto. For example, the heat radiation surfaces 16a may be parts to which heat radiation members are attached, or parts attached to the housing 7. The individual energization modules 10A and 10B have heat radiation surfaces 16a on a side reverse to a mount surface 20a of the control board 20A, in a state in which the energization modules 10A and 10B are mounted on the control board 20A.

The control board 20A is configured as a member separated from the energization modules 10A and 10B and electrically connected with each of the energization modules 10A and 10B, to control opening/closing of the electric paths 4 and 5 on the basis of the energization current flowing through the electric paths 4 and 5. The control board 20A forms a control circuit mainly formed of a microcomputer. In the control board 20A, the energization modules 10A and 10B are mounted on a side reverse to the mount surface 20a. The control board 20A is electrically connected with an electric control unit (ECU) (not illustrated) or the like in the vehicle, to transmit and receive signals to and from the ECU. The control board 20A according to the present embodiment includes a connection unit 21, two drive units 22A and 22B, a controller 23, a power supply controller 24, and a current sensor 26.

The controller 23 according to the present embodiment outputs a control signal to control driving of the energization modules 10A and 10B to the drive units 22A and 22B. The control signal is a signal to perform energization and shutoff of the electric paths 4 and 5 with, for example, the semiconductor switches Q1 and Q2. The controller 23 may be configured to output a control signal to the drive units 22A and 22B on the basis of a signal input from an external ECU or the like.

The power supply controller 24 is connected with a 12V battery 6 in the vehicle, to convert a direct-current voltage acquired from the 12V battery 6 into drive voltages of the individual units and apply the voltages to the controller 23 and the drive units 22A and 22B.

The current sensor 26 is a detector detecting the energization current of the electric path 4 (or electric path 5). The current sensor 26 is connected with the controller 23, and a detection value detected with the current sensor 26 is output to the controller 23.

The housing 7 is formed of an upper cover 8 and a lower cover 9, as illustrated in FIG. 4. The upper cover 8 and the lower cover 9 are formed of a synthetic resin or the like having insulating property. The lower cover 9 includes two openings 9a communicating with the outside. The energization modules 10A and 10B have a structure in which the heat radiation surfaces 16a of their housings 16 face the openings 9a, in a state in which the energization modules 10A and 10B are mounted on the control board 20A.

The following is an explanation of an example of energization and shutoff operations of the vehicle power supply device 100 according to the present embodiment. The controller 23 determines, with the current sensor 26, whether the electric path 4 is energized. The controller 23 acquires the energization current value detected with the current sensor 26 in the state in which the electric path 4 is energized. The controller 23 determines whether the energization current value exceeds the threshold, and outputs a control signal to the drive unit 22A when the energization current value exceeds the threshold. The drive unit 22A stops output of the drive signal to the semiconductor switches Q1 and Q2 of the energization module 10A in response to the control signal received from the controller 23. In this manner, each of the semiconductor switches Q1 and Q2 is changed to the off state, and the electric path 4 is shut off.

As explained above, the vehicle power supply device 100 according to the present embodiment includes the protection circuit unit 1 and the housing 7 containing the energization modules 10A and 10B and the control board 20A forming the protection circuit unit 1. The housing 7 includes openings 9a communicating with the outside. The energization modules 10A and 10B include the heat radiation surface 16a on a side reverse to the mount surface 20a of the control board 20A in the state in which the energization modules 10A and 10B are mounted on the control board 20A. The heat radiation surface 16a faces the opening 9a of the housing 7.

The structure described above produces similar effect to that of the first embodiment described above, and improves the heat radiation effect by exposing the heat radiation surfaces 16a of the energization modules 10A and 10B at high temperature in energization to the outside of the housing 7 and the external air. In addition, this structure enables handling of the energization modules 10A and 10B with one control board 20A, and enables reduction in cost by reduction in number of components. In addition, when the energization current flowing through the electric paths 4 and 5 differs due to the difference in vehicle model, this structure enables compatibility with a plurality of vehicle models by changing only the heat radiation members attached to the heat radiation surfaces 16a, without changing the control board 20A or the energization module 10A and 10B.

Figure 6:
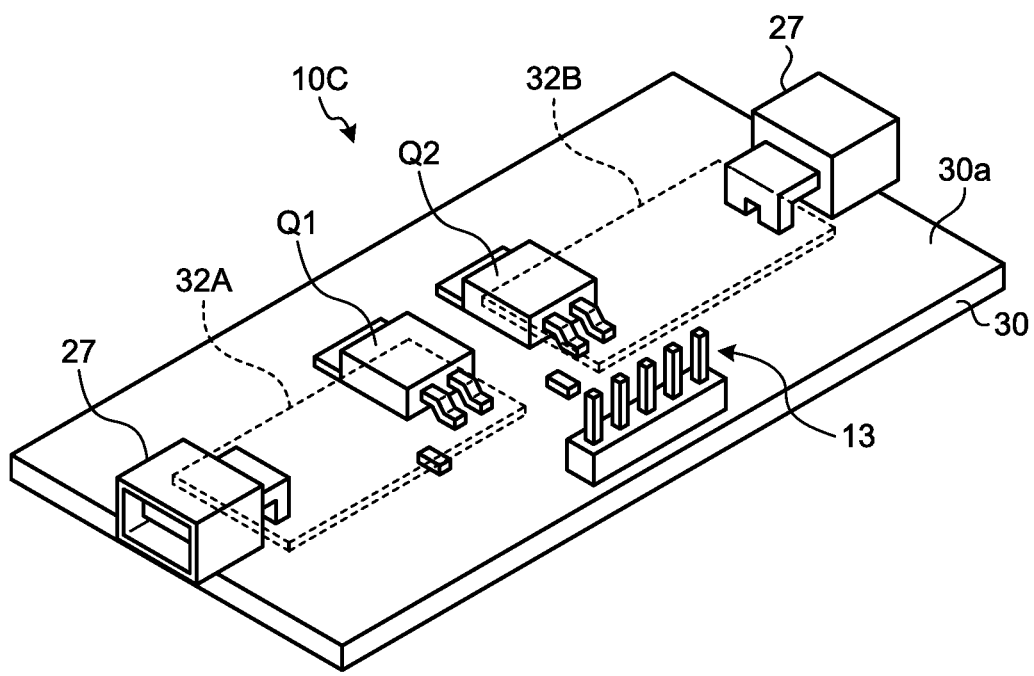
FIG. 6 is a perspective view illustrating a schematic structure of an energization module according to a modification of the first and the second embodiments.

In the first and the second embodiments described above, the energization modules 10, 10A, and 10B are formed with the resin mold member 14 or the housing 16, but the structure is not limited thereto. FIG. 6 is a perspective view illustrating a schematic structure of an energization module according to a modification of the first and the second embodiments. An energization module 10C in the modification of the present embodiment is different from the first and the second embodiments, in that the energization module 10C is formed of a thick copper board 30 in which a pair of bus bars 32A and 32B are formed as inner layers.

The thick copper board 30 includes a mount surface 30a. A pair of semiconductor switches Q1 and Q2, two connectors 27, and a control terminal 13 are mounted on the mount surface 30a. The thick copper board 30 includes a pair of bus bars 32A and 32B as inner layers. The semiconductor switches Q1 and Q2 are individually formed as separate components, and soldered onto the mount surface 30a. One of the two connectors 27 is connected with the bus bar 32A, and the other is connected with the bus bar 32B. One of the two connectors 27 is an input terminal and the other is an output terminal. One of the two connectors 27 is connected with the high-voltage battery 2, and the other is connected with the high-voltage load 3. Because the input terminal and the output terminal are formed as members separated from the bus bars, this structure enables easy compatibility even when the specifications of the thick copper board 30 are changed. In addition, because the input terminal and the output terminal are formed as connectors, this structure improves workability in assembly of the energization module 10C.

The bus bars 32A and 32B are connected with each other via the semiconductor switches Q1 and Q2 mounted on the mount surface 30a of the thick copper board 30. Because the bus bars 32A and 32B are formed as inner layers in the thick copper board 30, this structure enables miniaturization of the energization module itself.

In the first and the second embodiments, each of the semiconductor switches Q1 and Q2 is formed of a power MOS-FET, but the structure is not limited thereto. For example, each of the semiconductor switches Q1 and Q2 may be formed of a transistor and/or an insulated gate bipolar transistor (IGBT) or the like.

In addition, in the first and the second embodiments, each of the energization modules 10, 10A, and 10B includes a pair of semiconductor switches Q1 and Q2, but the structure is not limited thereto. For example, a semiconductor switch may be used, as long as the semiconductor switch has the same function as those of the semiconductor switches Q1 and Q2. In addition, each of the energization modules 10, 10A, and 10B may have a structure of including a semiconductor switch Q1 to open and close the electric paths 4 and 5 between the high-voltage battery 2 and the high-voltage load 3.

In the first and the second embodiments, the connection unit 21 includes three through holes 20b to correspond to three pin terminals common to the control terminals 13 of a plurality of types of the energization modules 10, but the structure is not limited thereto. For example, when the maximum number of pin terminals of the control terminal 13 is five in a plurality of types of the energization modules 10, the connection unit 21 may include at least five through holes 20b to correspond to the five pin terminals. In addition, the connection unit 21 includes a plurality of through holes 20b to correspond to the pin terminals forming the control terminal 13 of the energization module 10, but the structure is not limited thereto. The connection unit 21 may have a connection form in which connectors are connected.

The protection circuit unit and the vehicle power supply device according to the present embodiment produce the effect of enabling miniaturization of a control board at a low cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protection circuit unit comprising:
   at least one energization module disposed on an electric path between a power supply of a vehicle and a load receiving supply of power from the power supply, to open and close the electric path; and
   a control board configured to be a member separated from the energization module and electrically connected with the energization module, to control opening and closing of the electric path on the basis of an energization current flowing through the electric path, wherein
   the energization module includes:
   at least one semiconductor switch opening and closing the electric path;
   a bus bar connected at one end with the power supply side and connected at the other end with the load side, with the semiconductor switch interposed therebetween; and
   a control terminal connecting the semiconductor switch with the control board, and
   the control board includes a connection unit corresponding to the control terminal of each of a plurality of types of the energization modules,
   the control board includes a first side, a second side that is opposite to the first side, and a at least one electronic component mounted on a mount surface of the first side, and
   the energization module is mounted on the second side.

2. A vehicle power supply device comprising:
   the protection circuit unit according to claim 1; and a housing containing the energization module and the control board forming the protection circuit unit, wherein the housing includes an opening communicating with outside, the energization module includes a heat radiation surface on a side reverse to the mount surface of the control board in a state in which the energization module is mounted on the control board, and the heat radiation surface faces the opening.

3. The protection circuit unit of claim 1, wherein, the energization module further includes a resin mold member encapsulating the at least one semiconductor switch, a part of the control terminal, and a part of the bus bar.

* * * * *